US012292885B2

(12) United States Patent
Chen

(10) Patent No.: US 12,292,885 B2
(45) Date of Patent: May 6, 2025

(54) DATA PROCESSING METHOD AND DATA PROCESSING APPARATUS

(71) Applicant: Alibaba Cloud Computing Co. Ltd., Zhejiang (CN)

(72) Inventor: Zilin Chen, Zhejiang (CN)

(73) Assignee: Alibaba Cloud Computing Co. Ltd., Hangzhou (CN)

( * ) Notice: Subject to any disclaimer, the term of this patent is extended or adjusted under 35 U.S.C. 154(b) by 10 days.

(21) Appl. No.: 18/056,936

(22) Filed: Nov. 18, 2022

(65) Prior Publication Data

US 2023/0082563 A1    Mar. 16, 2023

Related U.S. Application Data

(63) Continuation of application No. PCT/CN2021/099343, filed on Jun. 10, 2021.

(30) Foreign Application Priority Data

Jun. 19, 2020 (CN) .......................... 202010567428.X

(51) Int. Cl.
*G06F 16/2453* (2019.01)
*G06F 16/2455* (2019.01)
(Continued)

(52) U.S. Cl.
CPC .. *G06F 16/24537* (2019.01); *G06F 16/24545* (2019.01); *G06F 16/24568* (2019.01); *G06F 16/254* (2019.01); *G06F 16/284* (2019.01)

(58) Field of Classification Search
CPC ......... G06F 16/24537; G06F 16/24545; G06F 16/24568; G06F 16/254; G06F 16/284; G06F 16/283; G06F 16/242; G06F 16/27
See application file for complete search history.

(56) References Cited

U.S. PATENT DOCUMENTS 10,007,695 B1    6/2018  Baid et al.
10,262,002 B2    4/2019  Brodt et al.
(Continued)

FOREIGN PATENT DOCUMENTS

CN     101021874 A    8/2007
CN     102609451 A    7/2012
(Continued)

OTHER PUBLICATIONS

First Search Report issued in corresponding Chinese Application No. 202010567428.X on Aug. 4, 2020 (2 pages).
(Continued)

*Primary Examiner* — Syling Yen
*Assistant Examiner* — Samuel C Sharpless, III
(74) *Attorney, Agent, or Firm* — Finnegan, Henderson, Farabow, Garrett & Dunner, LLP

(57) ABSTRACT

A data processing method includes: receiving a data processing request carrying a query statement; converting the query statement into a corresponding relational algebra tree based on the data processing request; determining an operation type corresponding to the query statement based on the relational algebra tree; delivering the query statement to a first database in response to the operation type being a first type; and completing the data processing request in the first database based on the query statement.

16 Claims, 7 Drawing Sheets

(51) Int. Cl.
    *G06F 16/25*     (2019.01)
    *G06F 16/28*     (2019.01)

(56) References Cited

U.S. PATENT DOCUMENTS

| | | | |
|---|---|---|---|
| 2018/0089268 | A1 | 3/2018 | Lee et al. |
| 2019/0026336 | A1* | 1/2019 | Tian .................... G06F 16/2455 |
| 2019/0243824 | A1 | 8/2019 | Gitelman et al. |
| 2020/0034364 | A1* | 1/2020 | Chamieh ........... G06F 16/24524 |
| 2020/0372027 | A1* | 11/2020 | Zhang ................... G06F 16/284 |
| 2021/0311946 | A1* | 10/2021 | Cheng ............... G06F 16/24542 |

FOREIGN PATENT DOCUMENTS

| | | |
|---|---|---|
| CN | 103345518 A | 10/2013 |
| CN | 104063486 A | 9/2014 |
| CN | 104704773 A | 6/2015 |
| CN | 106844545 A | 6/2017 |
| CN | 107209704 A | 9/2017 |
| CN | 108628972 A | 10/2018 |
| CN | 110018884 A | 7/2019 |
| CN | 110019251 A | 7/2019 |
| CN | 110020006 A | 7/2019 |
| CN | 110059103 A | 7/2019 |
| CN | 110263105 A | 9/2019 |
| CN | 110309196 A | 10/2019 |
| CN | 111475588 A | 7/2020 |
| WO | 2016078423 A1 | 5/2016 |

OTHER PUBLICATIONS

Supplemental Search Report issued in corresponding Chinese Application No. 202010567428.X on Sep. 9, 2020 (1 page).
PCT International Search Report and Written Opinion mailed Sep. 15, 2021, issued in corresponding International Application No. PCT/CN2021/099343 (14 pgs.).
Chinese Search Report issued in corresponding Chinese Application No. 202010849567.1 (2 pages), Mar. 15, 2023.
Heng et al., "Calculation Results Characteristics Extract and Reuse Strategy Based on Hive," Journal of Computer Research and Development, 52(9); 2014-2024, 2015. (translation of abstract).
First Office Action issued in corresponding Chinese Application No. 202010568737.9 on Aug. 10, 2020 (10 pages).

* cited by examiner

DATA PROCESSING METHOD AND DATA PROCESSING APPARATUS

CROSS-REFERENCE TO RELATED APPLICATIONS

The present application claims priority to International Application No. PCT/CN2021/099343, filed on Jun. 10, 2021, which claims priority to and the benefits of Chinese Patent Application Serial No. 202010567428.X, filed on Jun. 19, 2020, both of which are incorporated herein by reference in their entireties.

TECHNICAL FIELD

Embodiments of this disclosure relate to the field of data processing technologies, and in particular, to a data processing method. One or more embodiments of this disclosure also relate to a data processing apparatus, a computing device, and a computer-readable storage medium.

BACKGROUND

In Internet database solutions, the technology of read-write separation is generally used to realize the read and write operations of data. The traditional read-write separation provides a read-write separation connection string. For non-transactional read requests, the read requests are sent to a read-only database according to a read weight ratio configured by a user, but transactional read requests are directly sent to a primary instance (i.e., a primary database, which provides complete services, including read and write links). If a transaction contains an on-line analytical processing (OLAP) type read request, the OLAP type read request occupies too many resources of the primary instance, affecting the performance and stability of the primary instance.

Therefore, there is an urgent need to provide a data processing method that can reduce and avoid the preemption of resources of the primary instance by OLAP type read requests to ensure the stability of the database.

SUMMARY

Embodiments of the present disclosure provide a data processing method. In some embodiments, the data processing method includes: receiving a data processing request carrying a query statement; converting the query statement into a corresponding relational algebra tree based on the data processing request; determining an operation type corresponding to the query statement based on the relational algebra tree; delivering the query statement to a first database in response to the operation type being a first type; and completing the data processing request in the first database based on the query statement.

Embodiments of the present disclosure provide a computing device. In some embodiments, the computing device includes: a memory storing a set of computer-executable instructions, and one or more processors configured to execute the set of computer-executable instructions to cause the computing device to implement the data processing method above.

Embodiments of the present disclosure provide a non-transitory computer-readable medium storing a set of instructions that are executable by one or more processors of an apparatus to cause the apparatus to implement the data processing method above.

It should be understood that the above general descriptions and the following detailed descriptions are merely for exemplary and explanatory purposes, and do not limit the present disclosure.

DETAILED DESCRIPTION

Figure 1:
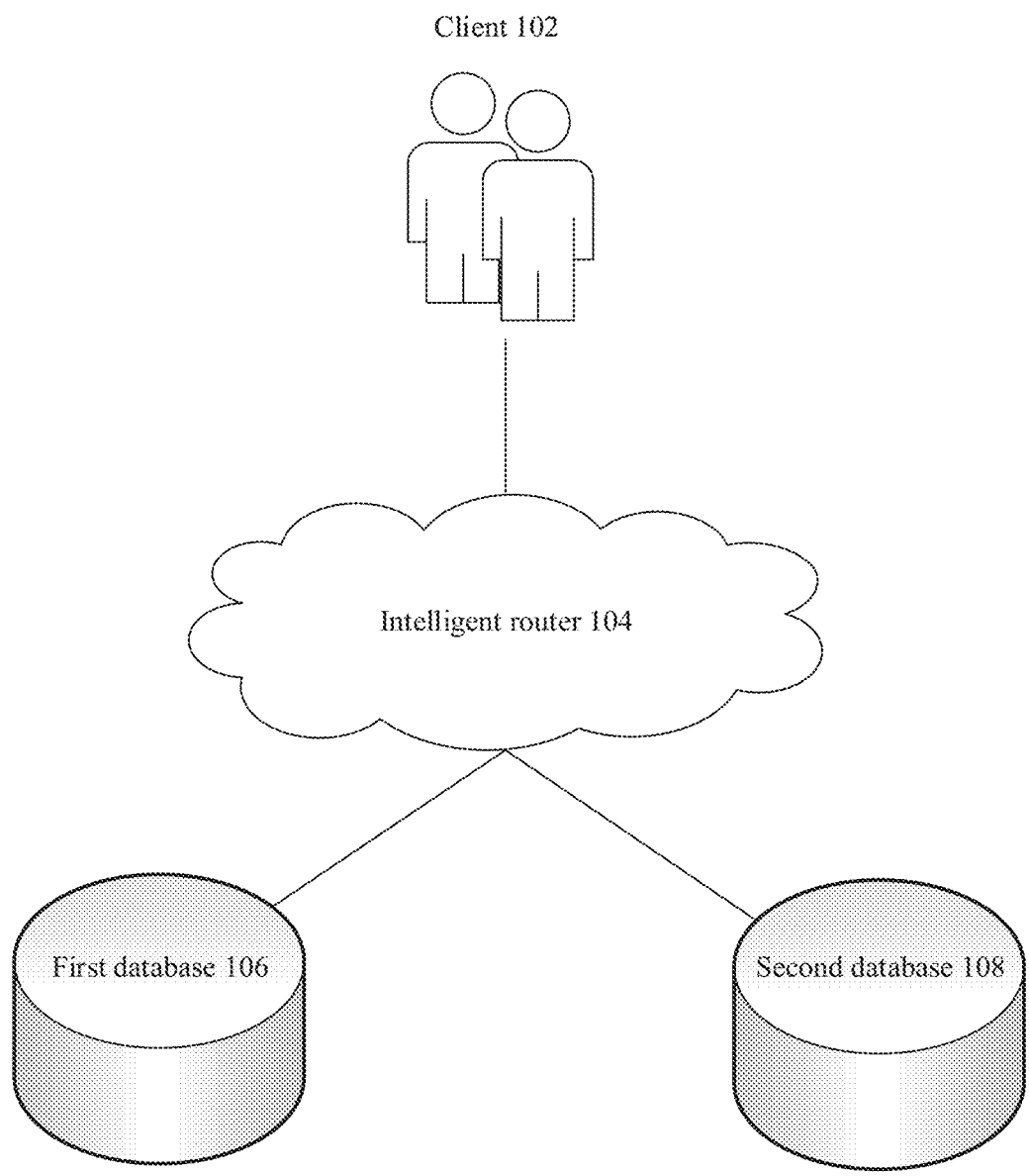
FIG. 1 is a schematic architectural diagram of an example data processing apparatus according to some embodiments of this disclosure.

In the following description, many specific details are described for thorough understanding of this disclosure. However, this disclosure may alternatively be implemented in other manners than those described herein, and a person skilled in the art may make similar modifications without departing from the content of this disclosure. Therefore, this disclosure is not limited to the embodiments disclosed below.

The terms used in one or more embodiments of this disclosure are merely used to describe the embodiments but are not intended to limit one or more embodiments of this disclosure. The "a" and "the" in a singular form used in one or more embodiments of this disclosure and the appended claims are also intended to include a plural form, unless other meanings are clearly indicated in the context. It should further be understood that the term "and/or" used in one or more embodiments of this disclosure indicates and includes any or all possible combinations of one or more associated listed items.

It should be understood that although the terms such as first, and second may be used to describe various information in one or more embodiments of this disclosure, but such information should not be limited to these terms. These terms are merely used to distinguish between information of the same type. For example, without departing from the scope of one or more embodiments of this disclosure, the first may also be referred to as the second. Similarly, the second may also be referred to as the first. Depending on the context, for example, the term "if" used herein may be interpreted as "while" or "when", or "in response to determination."

Structured Query Language (SQL), which is a special-purpose programming language, is a programming language for database query, and is used to access data and query, update and manage relational database systems. The workload in a database mainly includes On-Line Transaction Processing (OLTP) workload and On-Line Analytical Processing (OLAP) workload. The OLTP mainly includes SQL such as addition, deletion, modification and query involving a small range of data. The OLAP mainly includes complex query analytical SQL involving a large range of data. In the embodiments of the present disclosure, by the data processing method, whether an operation type corresponding to an SQL statement sent by a client is a first type (e.g., an OLTP type) or a second type (e.g., an OLAP type) can be intelligently identified. Only when the operation type corresponding to the SQL statement is the OLTP type, the SQL statement is delivered to a primary instance for processing, thereby ensuring low latency and high throughput of OLTP workload traffic and ensuring the stability of the database.

A data processing method is provided in the present disclosure. One or more embodiments of the present disclosure also relate to a data processing apparatus, a computing device, and a computer-readable storage medium, which will be described in detail one by one in the following embodiments.

Referring to FIG. 1, FIG. 1 is a schematic architectural diagram of an example data processing apparatus according to some embodiments of this disclosure. The data processing apparatus includes: a client 102, an intelligent router 104 (e.g., read-write separation link string), a first database 106, and a second database 108. The first database 106 may be construed as a distributed read-write database, and the second database 108 may be construed as a distributed read-only database. In the present disclosure, a read-write instance refers to a database instance on which read and write operations can be performed, and a read-only instance refers to a database instance on which only read operations can be performed. In practical applications, the first database 106 may also be construed as a read-write distributed data node of a distributed read-write database, that is, an RW node, and the second database 108 may also be construed as a read-only distributed data node of a distributed read-only database, that is, an RO node.

In some specific implementations, the client 102 delivers a query statement for the first database 106 or the second database 108 for data processing. After receiving the query statement sent by the client 102, the intelligent router 104 parses the query statement to determine an execution plan corresponding to the query statement. One SQL statement corresponds to multiple equivalent execution plans. The execution plan includes how to actually execute one SQL statement. Then, the intelligent router 104 calculates a physical execution cost of the query statement based on the execution plan. The cost of the execution plan includes information such as CPU, memory, and IO information. The physical execution cost is, for example, the number of instructions to be executed by a CPU when executing the query statement, the memory required to execute these instructions, the number of IO accesses, the number of required network interactions, etc. Finally, the intelligent router 104 determines an operation type corresponding to the query statement according to the physical execution cost of the query statement. The intelligent router 104 delivers the query statement to the first database 106 when the operation type is an OLTP type, and delivers the query statement to the second database 108 when the operation type is an OLAP type, so as to complete the data processing request of the client in the first database 106 or the second database 108. The query statement is an SQL statement.

The specific processing process of the data processing method will be described in detail below. In some specific implementations, the data processing method is applied to a Hybrid Transactional/Analytical Processing (HTAP) distributed database. In an HTAP workload, the OLTP workload and the OLAP workload coexist. The following data processing methods are described with the intelligent router 104 being the execution entity.

Figure 2:
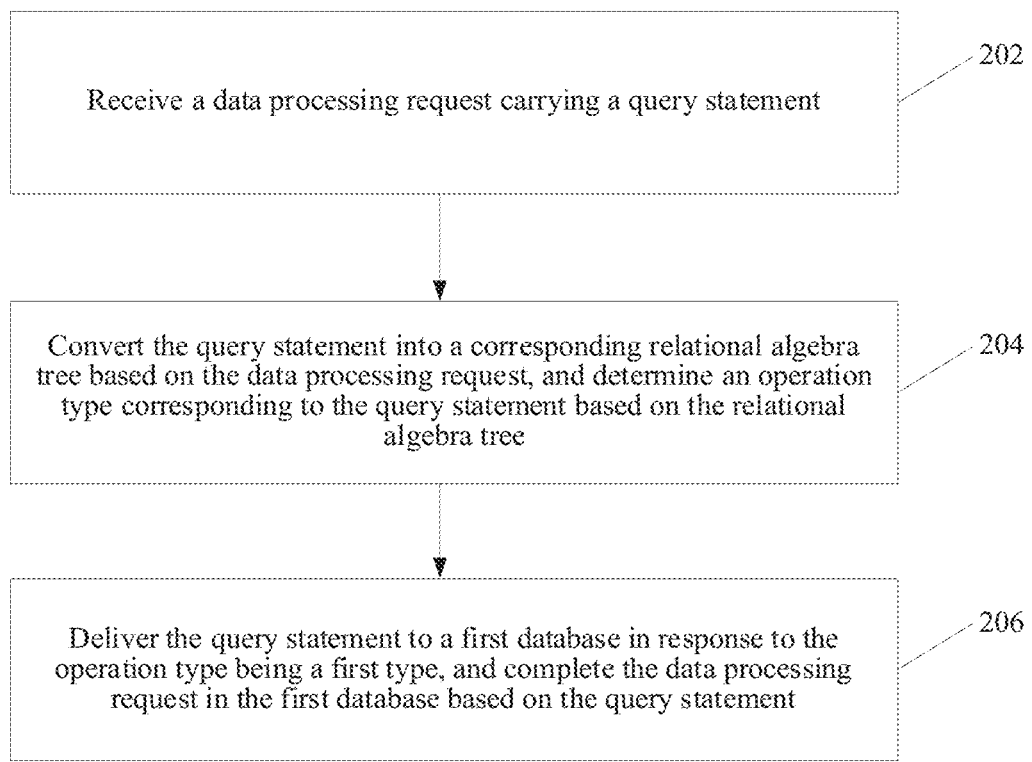
FIG. 2 is a flowchart of an example data processing method according to some embodiments of this disclosure.

Referring to FIG. 2, FIG. 2 is a flowchart of an example data processing method according to some embodiments of this disclosure. The data processing method includes the following steps 202, 204, and 206.

In the step 202, a data processing request carrying a query statement is received.

The data processing request includes but is not limited to a data query request, a data update request, a data read request, a data write request, etc. The query statement is an SQL statement.

The query statement carried in the data processing request is a specific data requirement of the data processing request. For example, the data processing request may be a data insertion request, and the query statement carried in the data processing request may specifically reflect which data is to be read from which table of which database and inserted into which table of which database.

For example, the data processing request sent by the client is a data insertion request, and correspondingly the query statement carried in the data insertion request may be: "insert into T select name from S," that is, a name field is selected from a table S and inserted into a table T.

In the step 204, the query statement is converted into a corresponding relational algebra tree based on the data processing request, and an operation type corresponding to the query statement is determined based on the relational algebra tree.

The converting the query statement into a corresponding relational algebra tree based on the data processing request may be construed as parsing the query statement based on the data processing request. A specific process of parsing the query statement is the process of converting the query statement into the corresponding relational algebra tree.

Specifically, the converting the query statement into the corresponding relational algebra tree includes: parsing the query statement into the corresponding abstract syntax tree (AST), and converting the abstract syntax tree into the corresponding relational algebra tree. The relational algebra tree includes tree nodes and edges.

The step of parsing the query statement into the corresponding abstract syntax tree is to parse the query statement and express its grammatical structure in the form of a tree.

Taking the above query statement carried in the data insertion request "insert into T select name from S" as an example, parsing the query statement into the corresponding abstract syntax tree is to express the query statement in the form of a tree. For example, "insert" is used as the first node of the tree, under which two input branch nodes are provided, where one node is "T", and the other node is "select name from S." Two branch nodes may further be provided under the node "select name from S," which are a node "S" and a node "name."

After the query statement is parsed into the corresponding abstract syntax tree, the abstract syntax tree is converted into the corresponding relational algebra tree. The relational algebra tree includes tree nodes and edges. Taking the query statement carried in the data insertion request as an example, the tree nodes of the relational algebra tree include at least a table scan node, a mapping node and a write node. The query statement may be determined based on the tree nodes of the relational algebra tree and a connection relationship between the edges connecting the tree nodes: it is needed to scan the table S, map the name field in the table S, and then write the mapped name field to the table T.

Specifically, after the query statement is specifically converted into the corresponding relational algebra tree, the operation type corresponding to the query statement may be determined based on the relational algebra tree.

In the embodiments of this disclosure, through the optimization strategy of converting the query statement into the relational algebra tree structure, the data processing method greatly improves the data processing efficiency during data processing on the database based on the query statement having the relational algebra tree structure.

In some specific implementations, the operation type of the query statement may be quickly determined based on structural information of the query statement that is based on the relational algebra tree corresponding to the query statement. A specific implementation method is described as follows.

In some embodiments, the step of determining an operation type corresponding to the query statement based on the relational algebra tree includes: determining the structural information of the query statement based on the relational algebra tree; and determining that the operation type corresponding to the query statement is a first type in response to the structural information of the query statement satisfying a first preset rule.

The first preset rule is a preset requirement that structural information corresponding to a query statement of the first type needs to meet.

Specifically, the relational algebra tree of the query statement may reflect specific structural information of the corresponding SQL statement, e.g., whether the SQL statement includes a primary key, whether the primary key has an index, whether the index has an equivalent condition, etc. If the first preset rule is that the query statement needs to include a primary key, the primary key has a corresponding index, and the index has an equivalent condition, and it is determined based on the relational algebra tree corresponding to the query statement that the structural information of the query statement includes a primary key, the primary key has a corresponding index, and the index has an equivalent condition, it can be determined that the structural information of the query statement satisfies the first preset rule. In this case, it can be determined that the operation type corresponding to the query statement is the first type. The first type is the OLTP type described above.

In the embodiments of this disclosure, by the data processing method, the operation type corresponding to the query statement can be quickly determined by determining whether the structural information of the query statement based on the relational algebra tree structure matches the preset rule. Then, based on the accurate operation type, the query statement can be delivered to a suitable database for data processing, thereby greatly improving the efficiency of data processing.

In some specific applications, the relational algebra tree corresponding to each query statement is expressed by tree nodes. That is, each query statement may be expressed by the corresponding tree nodes. Therefore, the operation type corresponding to the query statement may be determined more quickly based on the tree nodes corresponding to the query statement. A specific implementation is described as follows.

In some embodiments, the step of determining structural information of the query statement based on the relational algebra tree includes: determining structural information of the query statement based on the relational algebra tree. And correspondingly, the step of determining that the operation type corresponding to the query statement is a first type in response to the structural information of the query statement satisfying a first preset rule includes: determining that the operation type corresponding to the query statement is a first type in response to the tree nodes in the structural information of the query statement satisfying a first preset rule.

The tree nodes of the relational algebra tree corresponding to the query statement can express the specific meaning of each query statement. After the tree nodes of the relational algebra tree are determined, the structural information of the corresponding query statement can be seen according to the tree nodes. That is, it may be considered that the structural information of the query statement includes a plurality of tree nodes.

Taking the query statement carried in the data insertion request as an example, it can be determined by parsing the query statement that the relational algebra tree corresponding to the query statement includes at least three tree nodes: a table scan node, a mapping node, a write node, etc. In this case, it can be determined that the structural information of the query statement includes at least: the table scan node, the mapping node, the write node, etc. If the first preset rule is that the operation type corresponding to the query statement is determined to be the first type on the condition that the number of tree nodes in the structural information of the query statement is less than or equal to a preset number threshold of, for example, 3, because it can be known from the above description that the structural information of the query statement includes three tree nodes, and thus the first preset rule is satisfied. Thus, it can be determined that the operation type corresponding to the query statement is the first type.

By the data processing method provided in the embodiments of this disclosure, the operation type corresponding to the query statement can be determined more quickly by determining whether the tree nodes of the structural information of the query statement based on the relational algebra tree structure match the preset rule, and then based on the accurate operation type, the query statement can be delivered to a suitable database for data processing, thereby greatly improving the efficiency of data processing.

In addition, logical information corresponding to the query statement may also be determined based on the relational algebra tree corresponding to the query statement. In some other possible implementations, the operation type corresponding to the query statement can also be determined based on matching the logical information corresponding to the query statement. A specific implementation is described as follows.

In some embodiments, the step of determining an operation type corresponding to the query statement based on the relational algebra tree includes: determining the logical information of the query statement based on the relational algebra tree; and determining that the operation type corresponding to the query statement is a first type in response to the logical information of the query statement satisfying a second preset rule.

The second preset rule is a preset requirement that logical information corresponding to a query statement of the first type needs to meet. For example, the second preset rule includes a requirement on the number of rows in the table and the number of rows after filtering.

Specifically, the logical information of the query statement can be determined based on the relational algebra tree. Taking the query statement carried in the data insertion request as an example, it can be determined based on the relational algebra tree of the query statement that the logical information of the query statement is: the total number of rows in the table S is 1000, and if there is a where condition after the query statement: where age=20, the number of rows in the name field in the table S filtered according to the where condition is 300.

In this case, if the second preset rule is that the number of rows in the table in the query statement is less than or equal to a first preset row number threshold of, for example, 1000, and the number of rows after filtering is less than or equal to a second preset row number threshold of, for example, 500, it can be determined that the logical information of the query statement matches the second preset rules match. Thus, it can be determined that the operation type corresponding to the query statement is the first type.

By the data processing method provided in the embodiments of this disclosure, the operation type corresponding to the query statement can be determined quickly and conveniently by determining whether the logical information of the query statement matches preset logical information, thereby improving user experience.

In some other possible embodiments, to ensure the accuracy of the judgment of query statements of the first type, the query statement will not be directly defined as the second type even if the structural information of the query statement does not meet the first preset rule. A further judgment may be made based on the logical information of the query statement. A specific implementation is described as follows.

In some embodiments, after the step of determining structural information of the query statement based on the relational algebra tree, the method further includes: determining logical information of the query statement based on the relational algebra tree in response to the structural information of the query statement not satisfying the first preset rule; and determining that the operation type corresponding to the query statement is a first type in response to the logical information of the query statement satisfying a second preset rule.

Specifically, when the structural information of the query statement determined based on the relational algebra tree does not meet the first preset rule, but it is determined that the logical information of the query statement meets the second preset rule, the operation type corresponding to the query statement is still defined as the first type, so that data processing of the query statement may subsequently be performed in the first database corresponding to the first type, thereby improving the low-latency and high-throughput processing of the query statement of the first type.

In practical applications, even if the structural information of the query statement does not meet the first preset rule and the logical information of the query statement does not meet the second preset rule, a further judgment may be made on the query statement, to realize lossless screening of query statements of the first type. A specific implementation is described as follows.

In some embodiments, the step of determining an operation type corresponding to the query statement based on the relational algebra tree includes: determining structural information and logical information of the query statement based on the relational algebra tree; determining an execution plan of the query statement based on the relational algebra tree and calculating a physical execution cost of the query statement according to the execution plan, in response to the structural information of the query statement not satisfying a first preset rule and the logical information of the query statement not satisfying a second preset rule; and determining that the operation type corresponding to the query statement is a first type in response to the physical execution cost being less than or equal to a preset cost threshold.

The execution plan may be construed as a plan for actually executing an SQL statement. For example, reading of a field of a table in the SQL statement is executed first, and then writing of the read field in the SQL statement is executed. The physical execution cost is defined as Cost, which is the number of instructions to be executed by a CPU when executing an SQL statement, memory required to execute these instructions, the number of IO accesses, the number of required network interactions, etc.

The preset cost threshold may be set according to practical applications, for example, to 20,000, 30,000, etc., which is not limited herein.

Specifically, first, the execution plan of the corresponding query statement is determined based on the relational algebra tree. Then, the physical execution cost required for executing the SQL statement is calculated according to the execution plan. Then, when the physical execution cost is less than or equal to the preset cost threshold of, for example, 20,000, it is determined that the operation type corresponding to the query statement is the first type.

In some other possible implementations of this disclosure, after the query statement is received, the operation type corresponding to the query statement may be determined directly based on the above-mentioned cost rule, thereby improving the efficiency of data processing. A specific implementation is described as follows.

In some embodiments, the step of determining an operation type corresponding to the query statement based on the relational algebra tree includes: determining an execution plan of the query statement based on the relational algebra tree and calculating a physical execution cost of the query statement according to the execution plan; and determining that the operation type corresponding to the query statement is a first type in response to the physical execution cost being less than or equal to a preset cost threshold.

Specifically, the step of determining an execution plan of the query statement based on the relational algebra tree and calculating a physical execution cost of the query statement according to the execution plan includes: determining tree nodes of the relational algebra tree to determine the execution plan of the query statement based on the tree nodes; calculating a physical execution cost of each of the tree nodes corresponding to the query statement based on the execution plan of the query statement; and performing a weighted summation of the physical execution costs of the tree nodes to obtain the physical execution cost of the query statement.

In some specific implementations, the physical execution cost of each tree node in the query statement may be calculated according to the execution plan of the query statement, and then a weighted summation of the physical execution costs of all the tree nodes in the query statement is performed to obtain the final physical execution cost of the query statement.

In practical applications, a different weight is set for each physical execution cost. Therefore, the physical execution cost of the query statement is obtained by multiplying each physical execution cost by the corresponding weight and summing the products, so as to ensure the precision of the final physical execution cost of the query statement.

In specific applications, the comparison between the physical execution cost and the preset cost threshold includes two cases.

In the first case, the step of determining that the operation type corresponding to the query statement is a first type in response to the physical execution cost being less than or equal to a preset cost threshold includes: determining that the operation type corresponding to the query statement is the first type in response to the physical execution cost of any of the tree nodes corresponding to the query statement being less than or equal to the preset cost threshold.

That is, after the physical execution cost of each tree node of the query statement is calculated, the operation type corresponding to the corresponding query statement can be determined based on the physical execution cost of each tree node. For example, the physical execution cost of each tree node has a corresponding preset cost threshold. For example, if the query statement includes tree node 1 and tree node 2, the preset cost threshold corresponding to tree node 1 is 2000, and the preset cost threshold corresponding to tree node 2 is 3000, it can be determined that the operation type corresponding to the query statement is the first type, regardless whether the physical execution cost of the tree node 1 or the tree node 2 in the query statement is less than or equal to its corresponding preset cost threshold.

In the second case, the step of determining that the operation type corresponding to the query statement is a first type in response to the physical execution cost being less than or equal to a preset cost threshold includes: determining that the operation type corresponding to the query statement is the first type in response to a sum of the physical execution costs of all the tree nodes corresponding to the query statement being less than or equal to the preset cost threshold.

That is, the total physical execution cost of the query statement is obtained through the weighted summation of the physical execution costs of all tree nodes, and when the total physical execution cost is less than or equal to the preset cost threshold, it is determined that the operation type corresponding to the query statement is the first type.

By the data processing method provided in the embodiments of this disclosure, after the physical execution cost of each tree node is determined according to the execution plan of the query statement, the operation type corresponding to the query statement can be determined as the first type in a case that the physical execution cost of any one of the tree nodes corresponding to the query statement is less than or equal to the preset cost threshold. This can greatly improve the screening rate of query statements of the first type and ensure that processing of query statements of the OLTP type can be executed in the first database subsequently, thereby improving the efficiency of data processing.

In step 206, the query statement is delivered to a first database in response to the operation type being a first type, and the data processing request is completed in the first database based on the query statement.

Specifically, when the operation type corresponding to the query statement is determined as the first type by the various methods described above, the query statement may be delivered to the first database, and the data processing request may be executed in the first database according to the query statement.

In some specific implementations, the first type is an OLTP type. In this case, the first database is a distributed read-write database. And correspondingly, the step of delivering the query statement to a first database in response to the operation type being a first type includes: delivering the query statement to the distributed read-write database in response to the operation type being the OLTP type.

In some other embodiments of this disclosure, after the judgment made on the query statement by the above methods, if the physical execution cost of the query statement is greater than the preset cost threshold, it can be determined that the operation type corresponding to the query statement is the second type. A specific implementation is described as follows.

In some embodiments, the method further includes: determining that the operation type corresponding to the query statement is a second type in response to the physical execution cost being greater than the preset cost threshold.

The second type is the OLAP type. That is, only when the structural information of the query statement does not meet the first preset rule, the logical information of the query statement does not meet the second preset rule, and the physical execution cost of the query statement is greater than the preset cost threshold, it is determined that the operation type corresponding to the query statement is the OLAP type. Therefore, the separation of reading and writing of data processing is achieved, thereby ensuring the stability of the database.

The query statement is delivered to a second database in response to the operation type corresponding to the query statement being the second type, and the data processing request is completed in the second database based on the query statement. A specific implementation is described as follows.

In some embodiments, after the step of determining that the operation type corresponding to the query statement is a second type, the method further includes: delivering the query statement to a second database in response to the operation type corresponding to the query statement being the second type, and completing the data processing request in the second database based on the query statement.

In some specific implementations, the second type is an OLAP type. In this case, the second database is a distributed read-only database. Correspondingly, the step of delivering the query statement to a second database in response to the operation type corresponding to the query statement being the second type includes: delivering the query statement to the distributed read-only database in response to the operation type corresponding to the query statement being the OLAP type.

Specifically, query statements of the OLAP type are generally complex analytic query statements. If query statements of both the OLAP type and the OLTP type are delivered to the same database for data processing, resource preemption occurs. To ensure the stability of the database, the good read-write separation strategy implemented in the data processing method in the embodiments of this disclosure can be adopted to reduce and avoid preemption of resources of OLTP workloads by OLAP workloads, thereby making the database more stable.

Specifically, the first database is a distributed read-write database for processing query statements of the first type, and the second database is a distributed read-only database for processing query statements of the second type. That is, the first database may be construed as a primary database, and the second database may be construed as a standby database. Data in the primary database is synchronized to the standby database, but the data in the standby database has a certain delay. Data processing of query statements of the OLTP type generally involves changing the data in the database, and data processing of query statements of the OLAP type is generally the query and search operations of the data in the database. To ensure the integrity of the data and the efficiency of data processing, the data processing of query statements of the OLTP type is distributed to the first database for execution to ensure the read-write integrity of the data. The data processing of query statements of the QLAP type is distributed to the second database for execution, to avoid the preemption of resources of OLTP workloads by OLAP workloads, thereby making the database more stable and improving the efficiency of data processing.

Figure 3:
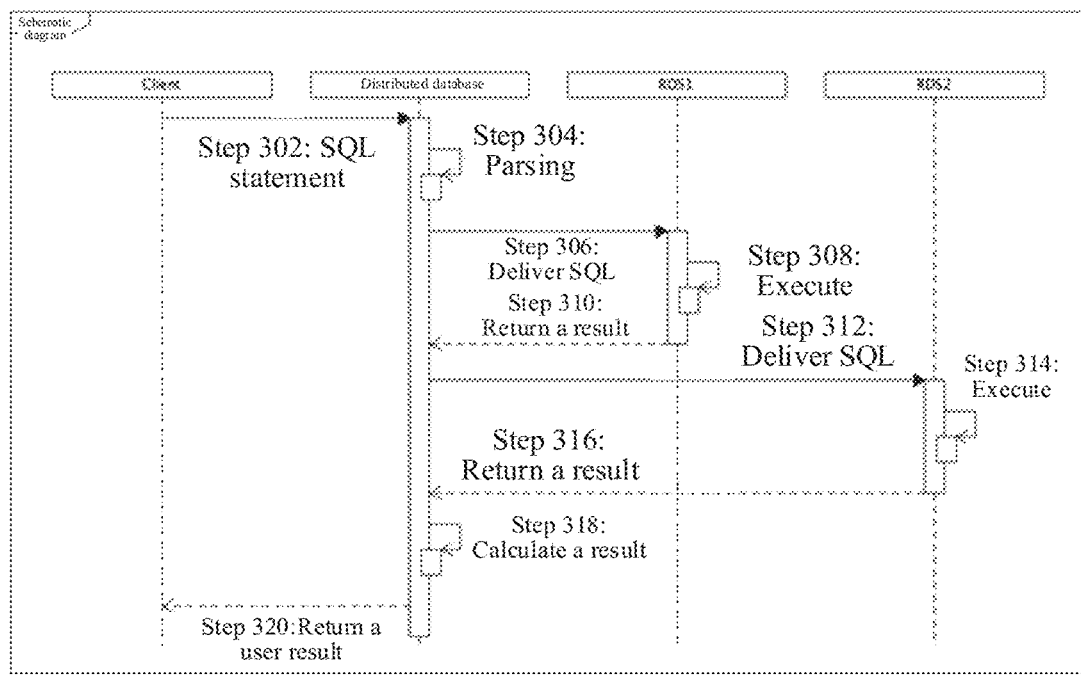
FIG. 3 is a flowchart of an example application of a data processing method to a hybrid transactional/analytical processing (HTAP) distributed database according to some embodiments of this disclosure.

Referring to FIG. 3, taking the application of the data processing method provided in some embodiments of this disclosure to an HTAP distributed database as an example, the case of the operation type corresponding to the SQL statement in the data processing method being the OLTP type is further described. Specifically, the method includes the following steps.

In step 302, a client delivers a data processing request carrying an SQL statement to an HTAP distributed database.

In step 304, an intelligent router in the distributed database parses the SQL statement and determines an operation type corresponding to the SQL statement.

In step 306, when determining that the operation type corresponding to the SQL statement is an OLTP type, the intelligent router in the distributed database delivers the SQL statement to the corresponding RDS1 data node.

An RDS data node is a distributed data node of a read-write database. For example, both the RDS1 and the RDS2 labeled in FIG. 3 are distributed data nodes of a read-write databases. The only difference between the RDS1 and the RDS2 is that data stored in the RDS1 is different from that stored in the RDS2. For example, the RDS1 stores data of name and age fields, and the RDS2 stores data of duty and address fields. After the SQL statement is parsed, the SQL statement that requires data processing of the fields in the RDS1 is delivered to the RDS1, and the SQL statement that requires data processing of the fields in the RDS2 is delivered to the RDS2.

In step 308, the RDS1 receives the SQL statement and executes the SQL statement on a data node thereof.

In step 310, the RDS1 returns a result of the execution of the SQL statement to the distributed database.

In step 312, the distributed database delivers the SQL statement to the corresponding RD2 data node.

In step 314, the RDS2 receives the SQL statement and executes the SQL statement on a data node thereof.

In step 316, the RDS2 returns a result of the execution of the SQL statement to the distributed database.

In step 318, the distributed database performs an integrated computation to the results returned by the RDS1 and the RDS2.

In step 320, the distributed database returns a result of the integrated computation to the client.

Specifically, steps 306, 308 and 310 and steps 312, 314 and 316 are not limited to a particular execution order, and may be executed concurrently in practical use. The execution order may be set according to practical applications.

In addition, an SQL statement may be delivered to multiple RDS data nodes of a distributed database for execution at the same time. The specific number of RDS data nodes required for executing the SQL statement depends on specific contents to be executed in the parsed SQL statement, and is not limited herein. For example, if the data to be executed in the SQL statement is stored in five RDS data nodes respectively, the execution of the SQL statement requires delivering the SQL statement to the corresponding five RDS data nodes for data processing at the same time.

By the data processing method provided in the embodiments of this disclosure, after receiving a data processing request of an SQL statement from a user, an intelligent router module analyzes a workload type of the SQL statement, and when determining, according to a result of the analysis, that the workload type of the SQL statement is an OLTP type, executes the SQL statement in a distributed data node of a read-write database, thereby achieving low-latency and high-throughput data processing.

Figure 4:
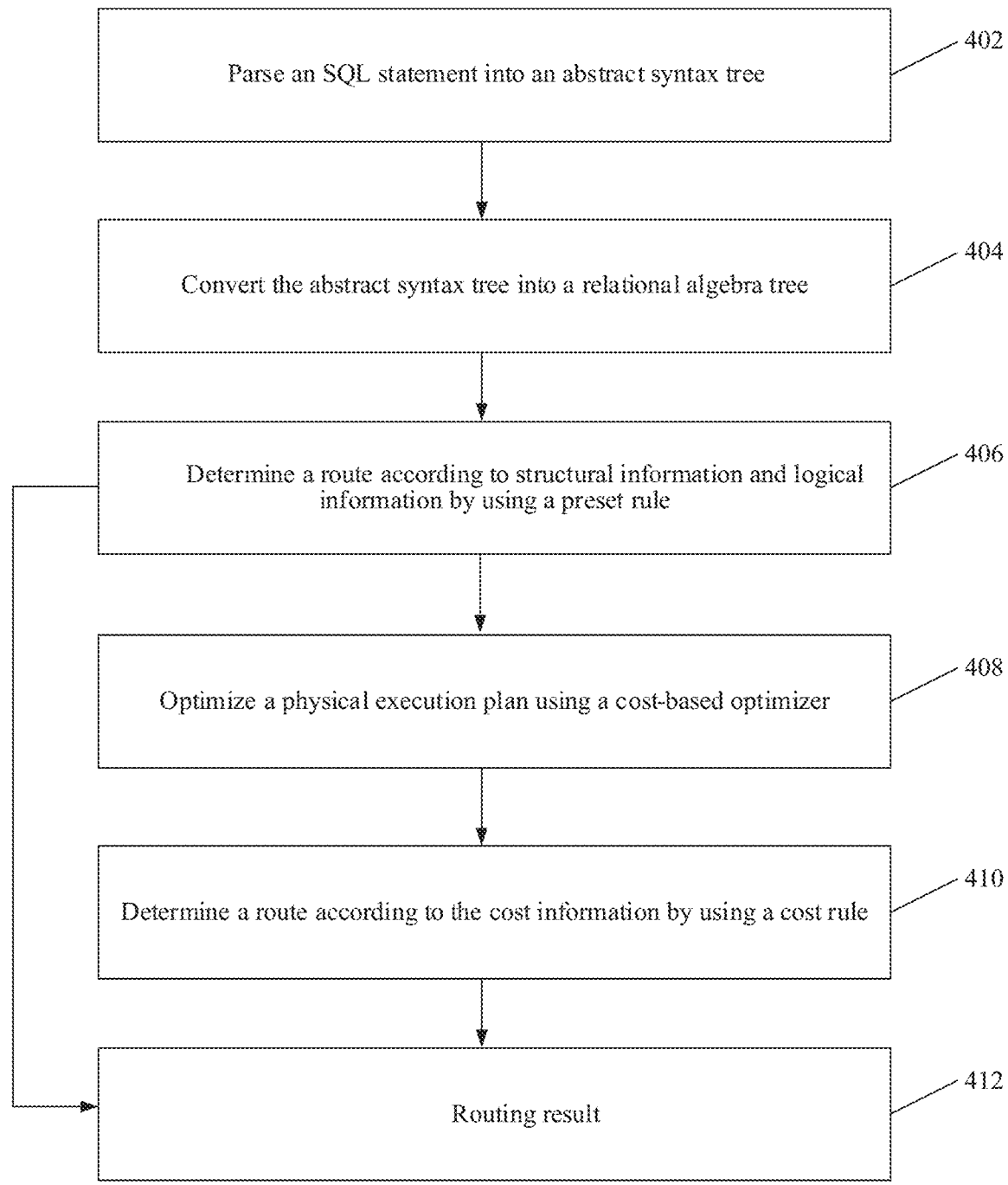
FIG. 4 is a detailed flowchart of analysis of an operation type corresponding to an SQL statement by an intelligent router in an example data processing method according to some embodiments of this disclosure.

Referring to FIG. 4, FIG. 4 is a detailed flowchart of analysis of an operation type corresponding to an SQL statement by an intelligent router in an example data processing method according to some embodiments of this disclosure. The method specifically includes the following steps.

In step 402, an SQL statement is parsed into an abstract syntax tree.

Specifically, after an SQL statement sent by a client is received, the SQL statement is parsed into an abstract syntax tree.

In step 404, the abstract syntax tree is converted into a relational algebra tree.

In step 406: a route is determined according to structural information and logical information by using a preset rule.

The preset rule may be construed as the first preset rule and the second preset rule in the foregoing embodiments.

Specifically, the step of determining the route according to the structural information and the logical information by using the preset rule may be construed as determining whether the structural information and the logical information of the SQL statement match the preset rule. If so, step 412 is executed. Otherwise, step 408 is executed.

In step 408, a physical execution plan is optimized using a cost-based optimizer.

Specifically, optimizing the physical execution plan using the cost-based optimizer is formulating the physical execution plan by the cost-based optimizer for the SQL statement to be executed. The physical execution plan includes how to actually execute the SQL statement.

In step 410, a route is determined according to the cost information by using a cost rule.

Specifically, a physical execution cost of executing the SQL statement is calculated according to the physical execution plan formulated for the SQL statement. For the physical execution cost, reference may be made to the foregoing embodiments, and the details will not be repeated herein. Then, a database to which the SQL statement needs to be routed is determined according to the calculated physical execution cost.

In step 412, the result is routed.

Specifically, when the structural information and the logical information of the SQL statement match the preset rule, it can be determined that the SQL statement needs to be routed to the distributed data node of the read-write database. When the structural information and the logical information of the SQL statement do not match the preset rule, whether the SQL statement needs to be routed to a read-write database or a read-only database can be determined according to the physical execution cost of the SQL statement, so as to realize the read-write separation of the SQL statements. Therefore, finally, requests of the OLTP type are routed to a read-write (RW) node, and requests of the OLAP type are routed to a read-only (RO) node, thereby ensuring stable Response Time (RT) and throughput for highly concurrent SQL requests of the OLTP type, without being affected by SQL requests of the OLAP type that consume a lot of resources, thereby ensuring the stability of the database. The response time refers to the time from requesting a transaction to returning a result after the system completes processing of the transaction.

The data processing method provided in the embodiments of this disclosure designs a read-write separation routing algorithm that can intelligently identify OLTP and OLAP workloads, is used for read-write separation to prevent OLAP workload traffic from affecting OLTP workload traffic, thereby ensuring low latency and high throughput of OLTP workload traffic. Therefore, the problem of mutual interference between OLAP workloads and OLTP workloads can be well solved without manual intervention.

Figure 5:
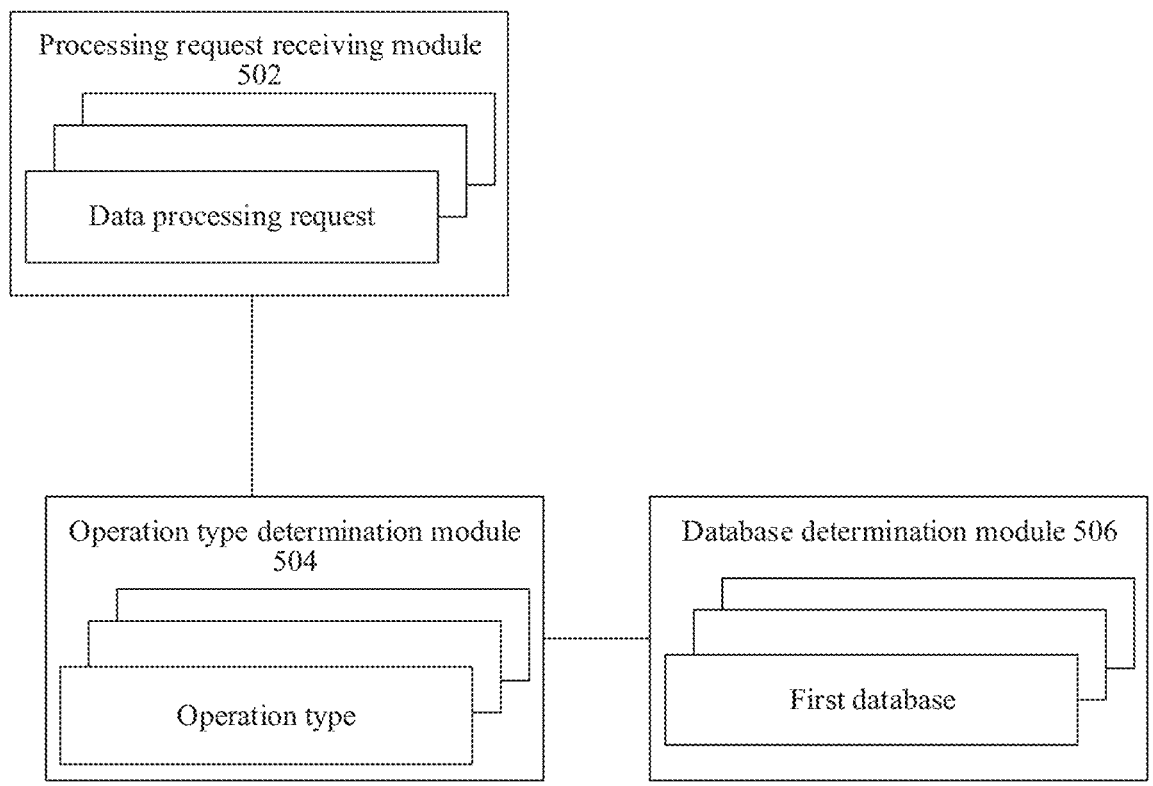
FIG. 5 is a schematic structural diagram of an example data processing apparatus according to some embodiments of this disclosure.

Corresponding to the foregoing method embodiments, this disclosure also provides embodiments of a data processing apparatus. FIG. 5 is a schematic structural diagram of an example data processing apparatus according to some embodiments of this disclosure. As shown in FIG. 5, the apparatus includes a processing request receiving module 502, an operation type determination module 504, and a database determination module 506.

The processing request receiving module 502 is configured to receive a data processing request carrying a query statement.

The operation type determination module 504 is configured to convert the query statement into a corresponding relational algebra tree based on the data processing request, and determine an operation type corresponding to the query statement based on the relational algebra tree.

The database determination module 506 is configured to deliver the query statement to a first database in response to the operation type being a first type, and complete the data processing request in the first database based on the query statement.

Optionally, the operation type determination module 504 is further configured to execute operations of parsing the query statement into a corresponding abstract syntax tree, and converting the abstract syntax tree into the corresponding relational algebra tree, where the relational algebra tree includes tree nodes and edges.

Optionally, the operation type determination module 504 is further configured to execute operations of determining structural information of the query statement based on the relational algebra tree and determining that the operation type corresponding to the query statement is a first type in response to the structural information of the query statement satisfying a first preset rule.

Optionally, the operation type determination module 504 is further configured to execute operations of: determining logical information of the query statement based on the relational algebra tree; and determining that the operation type corresponding to the query statement is a first type in response to the logical information of the query statement satisfying a second preset rule.

Optionally, the apparatus further includes a logical information determination module and a transaction type determination module.

The logical information determination module is configured to determine logical information of the query statement based on the relational algebra tree in response to the structural information of the query statement not satisfying the first preset rule.

The transaction type determination module is configured to determine that the operation type corresponding to the query statement is the first type in response to the logical information of the query statement satisfying a second preset rule.

Optionally, the operation type determination module 504 is further configured to execute operations of: determining structural information and logical information of the query statement based on the relational algebra tree, determining an execution plan of the query statement based on the relational algebra tree and calculating a physical execution cost of the query statement according to the execution plan, in response to the structural information of the query statement not satisfying a first preset rule and the logical information of the query statement not satisfying a second preset rule, and determining that the operation type corresponding to the query statement is a first type in response to the physical execution cost being less than or equal to a preset cost threshold.

Optionally, the operation type determination module 504 is further configured to execute operations of: determining an execution plan of the query statement based on the relational algebra tree and calculating a physical execution cost of the query statement according to the execution plan, and determining that the operation type corresponding to the query statement is a first type in response to the physical execution cost being less than or equal to a preset cost threshold.

Optionally, the operation type determination module 504 is further configured to execute operations of: determining tree nodes of the relational algebra tree to determine the execution plan of the query statement based on the tree nodes; calculating a physical execution cost of each of the tree nodes corresponding to the query statement based on the execution plan of the query statement, and performing a weighted summation of the physical execution costs of the tree nodes to obtain the physical execution cost of the query statement.

Optionally, the operation type determination module 504 is further configured to execute operations of: determining that the operation type corresponding to the query statement is the first type in response to the physical execution cost of any of the tree nodes corresponding to the query statement being less than or equal to the preset cost threshold.

Optionally, the apparatus further includes a second type determination module configured to determine that the operation type corresponding to the query statement is a second type in response to the physical execution cost being greater than the preset cost threshold.

Optionally, the apparatus further includes a data processing module configured to deliver the query statement to a second database in response to the operation type corresponding to the query statement being the second type, and complete the data processing request in the second database based on the query statement.

Optionally, the first database is a distributed read-write database for processing query statements of the first type, and the second database is a distributed read-only database for processing query statements of the second type.

Optionally, the first type is an OLTP type, and correspondingly, the database determination module 506 is further configured to deliver the query statement to the distributed read-write database in response to the operation type being the OLTP type.

Optionally, the second type is an OLAP type, and correspondingly, the data processing module is further configured to deliver the query statement to the distributed read-only database in response to the operation type corresponding to the query statement being the OLAP type.

Some embodiments of this disclosure implement a data processing apparatus, which can intelligently identify whether an operation type corresponding to an SQL statement sent by a client is an OLTP type or an OLAP type, and deliver the SQL statement to a primary instance (that is, a read-write database) for processing only when the operation type corresponding to the SQL statement is the OLTP type, thereby ensuring low latency and high throughput of OLTP workload traffic and ensuring the stability of the database.

The above is a schematic solution of a data processing apparatus according to some embodiments. It should be noted that the technical solution of the data processing apparatus and the technical solution of the foregoing data processing method belong to the same concept, and for the details that are not set forth in the technical solution of the data processing apparatus, reference may be made to the description of the technical solution of the foregoing data processing method.

Figure 6:
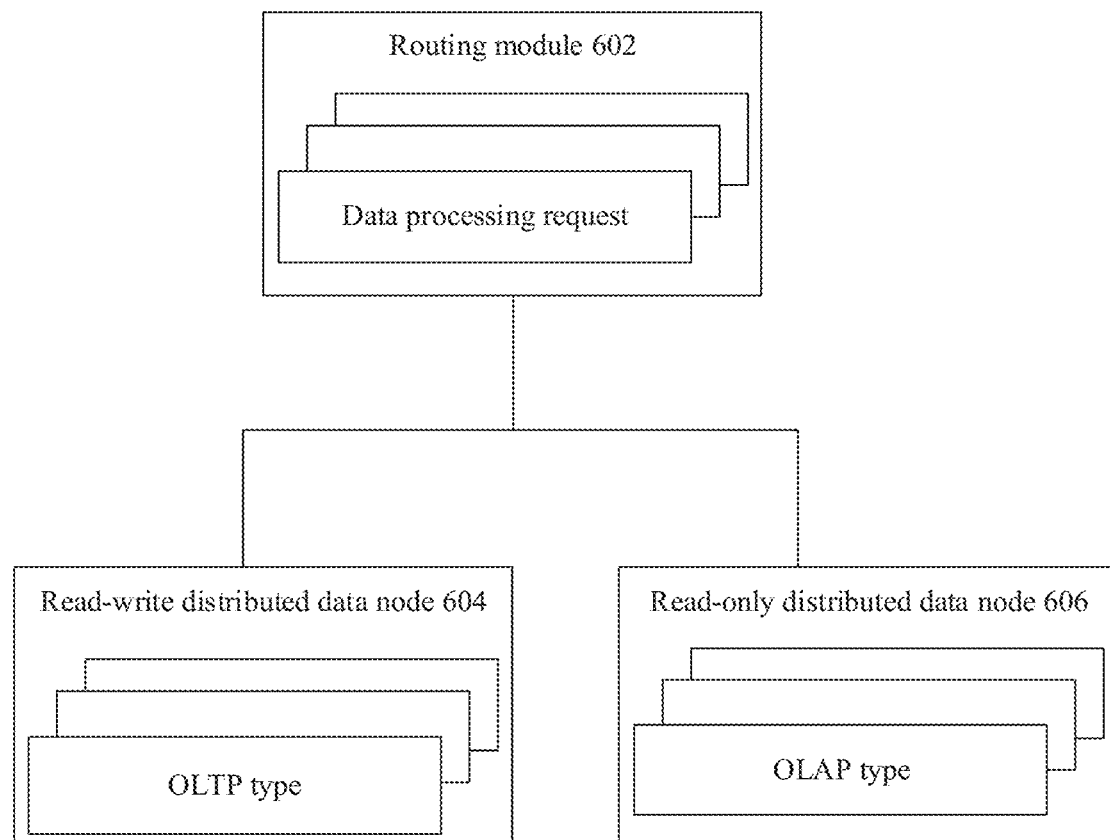
FIG. 6 is a schematic structural diagram of an example data processing system according to some embodiments of this disclosure.

Referring to FIG. 6, FIG. 6 is a schematic structural diagram of an example data processing system according to some embodiments of this disclosure.

The data processing system includes: a routing module 602, a read-write distributed data node 604, and a read-only distributed data node 606.

The routing module 602 is configured to receive a data processing request carrying a query statement, and determine an operation type corresponding to the query statement based on the data processing request.

The routing module 602 is further configured to deliver the query statement to the read-write distributed data node 604 in response to the operation type being an OLTP type, and complete the data processing request at the read-write distributed data node 604 based on the query statement.

The routing module 602 is further configured to deliver the query statement to the read-only distributed data node 606 in response to the operation type being an OLAP type, and complete the data processing request at the read-only distributed data node 606 based on the query statement.

In the data processing system provided in the embodiments of this disclosure, after receiving a data processing request carrying a query statement sent by a client, the routing module 602 converts the query statement into a corresponding relational algebra tree based on the data processing request, and determines an operation type corresponding to the query statement based on the relational algebra tree. The routing module 602 delivers the query statement to the read-write distributed data node 604 in response to the operation type being an OLTP type, and completes the data processing request at the read-write distributed data node 604 based on the query statement, or delivers the query statement to the read-only distributed data node 606 in response to the operation type being an OLAP type, and completes the data processing request at the read-only distributed data node 606 based on the query statement. The routing module 602 can intelligently identify whether an operation type corresponding to a query statement sent by a client is an OLTP type or an OLAP type, and deliver the query statement to a primary instance for processing only when the operation type corresponding to the query statement is the OLTP type, thereby ensuring low latency and high throughput of OLTP workload traffic and ensuring the stability of the database.

Figure 7:
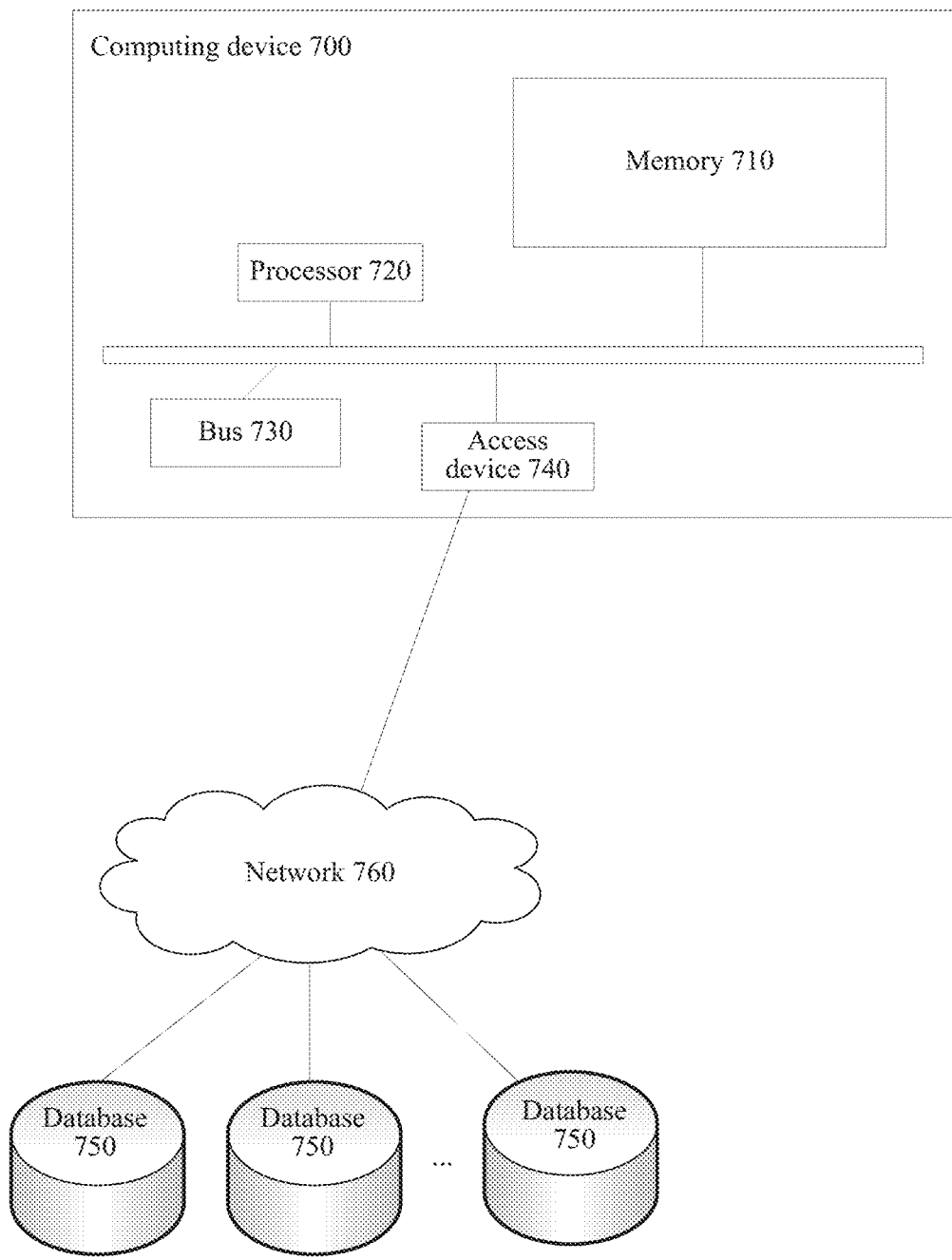
FIG. 7 is a structural block diagram of an example computing device according to some embodiments of this disclosure.

FIG. 7 is a schematic block diagram of an example computing device 700 according to some embodiments of this disclosure. Components of the computing device 700 include, but are not limited to, a memory 710 storing a set of computer-executable instructions and a processor 720. The processor 720 and the memory 710 are connected through a bus 730. A database 750 is configured to store data.

The computing device 700 further includes an access device 740. The access device 740 is configured to enable the computing device 700 to communicate via one or more networks 760. Examples of the networks include a public switched telephone network (PSTN), a local area network (LAN), a wide area network (WAN), a personal area network (PAN), or a combination of communication networks such as the internet. The access device 740 may include one or more of wired or wireless network interfaces (e.g., a network interface card (NIC)) of any types, such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, a near field communication (NFC) interface, or the like.

In some embodiments of this disclosure, the foregoing components and other components not shown in FIG. 7 of the computing device 700 may be connected, for example, through the bus. It should be understood that the structural block diagram of the computing device 700 shown in FIG. 7 is merely exemplary, and is not intended to limit the scope of the present disclosure. A person skilled in the art may add or replace other components according to needs.

The computing device 700 may be a stationary or mobile computing device of any type, including a mobile computer, a mobile computing device (e.g., a tablet computer, a person digital assistant, a laptop computer, a notebook, or a netbook), a mobile phone (e.g., a smartphone), a wearable computing device (e.g., a smartwatch, smart glasses, etc.), any other mobile devices, or a stationary computing device such as a desktop computer or a personal computer (PC). The computing device 700 may alternatively be a mobile or stationary server.

The processor 720 is configured to execute the following computer-executable instructions to cause the computing device 700 to perform: receiving a data processing request carrying a query statement; converting the query statement into a corresponding relational algebra tree based on the data processing request, and determining an operation type corresponding to the query statement based on the relational algebra tree; and delivering the query statement to a first database in response to the operation type being a first type, and completing the data processing request in the first database based on the query statement.

The above is a schematic solution of a computing device according to some embodiments. It should be noted that the technical solution of the computing device and the technical solution of the foregoing data processing method belong to the same concept, and for the details that are not set forth in the technical solution of the computing device, reference may be made to the description of the technical solution of the foregoing data processing method.

Some embodiments of this disclosure further provide a transitory or non-transitory computer-readable storage medium, storing a set of computer instructions that is executable by one or more processors of an apparatus to cause the apparatus to implement operations of a data processing method including: receiving a data processing request carrying a query statement sent by a client; converting the query statement into a corresponding relational algebra tree based on the data processing request, and determining an operation type corresponding to the query statement based on the relational algebra tree; and delivering the query statement to a first database in response to the operation type being a first type, and completing the data processing request in the first database based on the query statement.

The above is a schematic solution of a computer-readable storage medium according to some embodiments. It should be noted that the technical solution of the storage medium and the technical solution of the foregoing data processing method belong to the same concept, and for the details that are not set forth in the technical solution of the storage medium, reference may be made to the description of the technical solution of the foregoing data processing method.

Specific embodiments of this disclosure are described above. Other embodiments are within the scope of the appended claims. In some cases, the actions or steps recited in the claims may be performed in a different order than in the embodiments and the desired result may still be achieved. In addition, the processes depicted in the accompanying drawings do not necessarily require the particular order shown or sequential order to achieve the desired results. In some embodiments, multitasking and parallel processing are also possible or may be advantageous.

The computer instructions include computer program code. The computer program code may be in a source code form, an object code form, executable file or some intermediate forms, or the like. The computer-readable medium may include: any entity or apparatus that is capable of carrying the computer program code, a recording medium, a USB flash drive, a removable hard disk, a magnetic disk, an optical disc, a computer memory, a read-only memory (ROM), a random-access memory (RAM), an electric carrier signal, a telecommunication signal and a software distribution medium, or the like. It should be noted that, the content contained in the computer-readable medium may be appropriately increased or decreased according to the requirements of legislation and patent practice in jurisdictions. For example, in some jurisdictions, according to legislation and patent practice, the computer-readable medium does not include an electric carrier signal and a telecommunication signal.

The foregoing method embodiments are expressed as a series of action combinations for the purpose of brief description, but it is to be understood by a person skilled in the art that because some steps may be performed in other sequences or simultaneously according to the embodiments of this disclosure, the embodiments of this disclosure are not limited to a described action sequence. Secondly, those skilled in the art should also know that the embodiments described in the specification are all preferred embodiments, and the actions and modules involved are not necessarily required by the embodiments of this disclosure.

In the foregoing embodiments, the description of each embodiment has respective focuses. For a part that is not described in detail in some embodiments, reference may be made to related descriptions in other embodiments.

The embodiments may further be described using the following clauses:

1. A data processing method, comprising:
receiving a data processing request carrying a query statement;
converting the query statement into a corresponding relational algebra tree based on the data processing request;
determining an operation type corresponding to the query statement based on the relational algebra tree;
delivering the query statement to a first database in response to the operation type being a first type; and
completing the data processing request in the first database based on the query statement.

2. The data processing method of clause 1, wherein the converting the query statement into the corresponding relational algebra tree comprises:
parsing the query statement into a corresponding abstract syntax tree; and
converting the abstract syntax tree into the corresponding relational algebra tree, wherein the relational algebra tree includes tree nodes and edges.

3. The data processing method of clause 2, wherein the determining the operation type corresponding to the query statement based on the relational algebra tree comprises:
determining structural information of the query statement based on the relational algebra tree; and
determining that the operation type corresponding to the query statement is the first type in response to the structural information of the query statement satisfying a first preset rule.

4. The data processing method of clause 3, wherein after the determining the structural information of the query statement based on the relational algebra tree, the method further comprises:
determining logical information of the query statement based on the relational algebra tree in response to the structural information of the query statement not satisfying the first preset rule; and
determining that the operation type corresponding to the query statement is the first type in response to the logical information of the query statement satisfying a second preset rule.

5. The data processing method of any of clauses 2-4, wherein the determining the operation type corresponding to the query statement based on the relational algebra tree comprises:
determining logical information of the query statement based on the relational algebra tree; and
determining that the operation type corresponding to the query statement is the first type in response to the logical information of the query statement satisfying a second preset rule.

6. The data processing method of any of clauses 2-5, wherein the determining the operation type corresponding to the query statement based on the relational algebra tree comprises:
determining structural information and logical information of the query statement based on the relational algebra tree;
in response to the structural information of the query statement not satisfying a first preset rule and the logical information of the query statement not satisfying a second preset rule:
determining an execution plan of the query statement based on the relational algebra tree; and
calculating a physical execution cost of the query statement according to the execution plan; and
determining that the operation type corresponding to the query statement is the first type in response to the physical execution cost being less than or equal to a preset cost threshold.

7. The data processing method according to any of clauses 2-6, wherein the determining the operation type corresponding to the query statement based on the relational algebra tree comprises:
determining an execution plan of the query statement based on the relational algebra tree;
calculating a physical execution cost of the query statement according to the execution plan; and
determining that the operation type corresponding to the query statement is the first type in response to the physical execution cost being less than or equal to a preset cost threshold.

8. The data processing method of clause 7, wherein the determining the execution plan of the query statement based on the relational algebra tree and the calculating the physical execution cost of the query statement according to the execution plan comprises:
determining tree nodes of the relational algebra tree to determine the execution plan of the query statement based on the tree nodes;
calculating the physical execution cost of each of the tree nodes corresponding to the query statement based on the execution plan of the query statement; and
performing a weighted summation of the physical execution costs of the tree nodes to obtain the physical execution cost of the query statement.

9. The data processing method of clause 8, wherein the determining that the operation type corresponding to the query statement is the first type in response to the physical execution cost being less than or equal to the preset cost threshold comprises:
determining that the operation type corresponding to the query statement is the first type in response to the physical execution cost of any of the tree nodes corresponding to the query statement being less than or equal to the preset cost threshold.

10. The data processing method of any of clauses 7-9, further comprising:
determining that the operation type corresponding to the query statement is a second type in response to the physical execution cost being greater than the preset cost threshold.

11. The data processing method of clause 10, wherein after the determining that the operation type corresponding to the query statement is the second type, the method further comprises:
delivering the query statement to a second database in response to the operation type corresponding to the query statement being the second type; and
completing the data processing request in the second database based on the query statement.

12. The data processing method of clause 11, wherein the first database is a distributed read-write database for processing query statements of the first type, and the second database is a distributed read-only database for processing query statements of the second type.

13. The data processing method of clause 12, wherein the first type is an on-line transaction processing (OLTP) type; and
correspondingly, the delivering the query statement to the first database in response to the operation type being the first type comprises:
delivering the query statement to the distributed read-write database in response to the operation type being the OLTP type.

14. The data processing method of clause 13, wherein the second type is an on-line analytical processing (OLAP) type; and
correspondingly, the delivering the query statement to the second database in response to the operation type corresponding to the query statement being the second type comprises:
delivering the query statement to the distributed read-only database in response to the operation type corresponding to the query statement being the OLAP type.

15. A data processing apparatus, comprising:
a processing request receiving module configured to receive a data processing request carrying a query statement;
an operation type determination module configured to convert the query statement into a corresponding relational algebra tree based on the data processing request, and determine an operation type corresponding to the query statement based on the relational algebra tree; and
a database determination module configured to deliver the query statement to a first database in response to the operation type being a first type, and complete the data processing request in the first database based on the query statement.

16. A data processing system, comprising:
a routing module;
a read-write distributed data node; and
a read-only distributed data node,
wherein the routing module is configured to receive a data processing request carrying a query statement, and determine an operation type corresponding to the query statement based on the data processing request;
in response to the operation type being an on-line transaction processing (OLTP) type, the query statement is delivered to the read-write distributed data node, and the data processing request is completed at the read-write distributed data node based on the query statement; and
in response to the operation type being an on-line analytical processing (OLAP) type, the query statement is delivered to the read-only distributed data node and the data processing request is completed at the read-only distributed data node based on the query statement.

17. A computing device, comprising:
a memory storing a set of computer-executable instructions; and
one or more processors configured to execute the computer-executable instructions to cause the computing device to perform:
receiving a data processing request carrying a query statement;
converting the query statement into a corresponding relational algebra tree based on the data processing request;
determining an operation type corresponding to the query statement based on the relational algebra tree;
delivering the query statement to a first database in response to the operation type being a first type; and
completing the data processing request in the first database based on the query statement.

18. The computing device of 17, wherein the one or more processors are configured to execute the computer-executable instructions to cause the computing device to convert the query statement into the corresponding relational algebra tree by:
parsing the query statement into a corresponding abstract syntax tree, and converting the abstract syntax tree into the corresponding relational algebra tree, wherein the relational algebra tree includes tree nodes and edges.

19. The computing device of 18, wherein the one or more processors are configured to execute the computer-executable instructions to cause the computing device to determine the operation type corresponding to the query statement based on the relational algebra tree by:
determining structural information of the query statement based on the relational algebra tree; and
determining that the operation type corresponding to the query statement is the first type in response to the structural information of the query statement satisfying a first preset rule.

20. The computing device of 19, wherein the one or more processors are configured to execute the computer-executable instructions to cause the computing device to, after determining the structural information of the query statement based on the relational algebra tree, further perform:
determining logical information of the query statement based on the relational algebra tree in response to the structural information of the query statement not satisfying the first preset rule; and
determining that the operation type corresponding to the query statement is the first type in response to the logical information of the query statement satisfying a second preset rule.

21. The computing device of any of clauses 18-20, wherein the one or more processors are configured to execute the computer-executable instructions to cause the computing device to determine the operation type corresponding to the query statement based on the relational algebra tree by:
determining logical information of the query statement based on the relational algebra tree; and
determining that the operation type corresponding to the query statement is the first type in response to the logical information of the query statement satisfying a second preset rule.

22. The computing device any of clauses 18-21, wherein the one or more processors are configured to execute the computer-executable instructions to cause the computing device to determine the operation type corresponding to the query statement based on the relational algebra tree by:
determining structural information and logical information of the query statement based on the relational algebra tree;
in response to the structural information of the query statement not satisfying a first preset rule and the logical information of the query statement not satisfying a second preset rule:
  determining an execution plan of the query statement based on the relational algebra tree; and
  calculating a physical execution cost of the query statement according to the execution plan; and
determining that the operation type corresponding to the query statement is the first type in response to the physical execution cost being less than or equal to a preset cost threshold.

23. The computing device any of clauses 18-22, wherein the one or more processors are configured to execute the computer-executable instructions to cause the computing device to determine the operation type corresponding to the query statement based on the relational algebra tree by:
determining an execution plan of the query statement based on the relational algebra tree;
calculating a physical execution cost of the query statement according to the execution plan; and
determining that the operation type corresponding to the query statement is the first type in response to the physical execution cost being less than or equal to a preset cost threshold.

24. The computing device of 23, wherein the one or more processors are configured to execute the computer-executable instructions to cause the computing device to determine the execution plan of the query statement based on the relational algebra tree and calculate the physical execution cost of the query statement according to the execution plan by:
determining tree nodes of the relational algebra tree to determine the execution plan of the query statement based on the tree nodes;
calculating the physical execution cost of each of the tree nodes corresponding to the query statement based on the execution plan of the query statement; and
performing a weighted summation of the physical execution costs of the tree nodes to obtain the physical execution cost of the query statement.

25. The computing device of 24, wherein the one or more processors are configured to execute the computer-executable instructions to cause the computing device to determine that the operation type corresponding to the query statement is the first type in response to the physical execution cost being less than or equal to the preset cost threshold by:
determining that the operation type corresponding to the query statement is the first type in response to the physical execution cost of any of the tree nodes corresponding to the query statement being less than or equal to the preset cost threshold.

26. The computing device any of clauses 23-25, wherein the one or more processors are configured to execute the computer-executable instructions to cause the computing device to further perform:
determining that the operation type corresponding to the query statement is a second type in response to the physical execution cost being greater than the preset cost threshold.

27. The computing device of clause 26, wherein the one or more processors are configured to execute the computer-executable instructions to cause the computing device to, after determining that the operation type corresponding to the query statement is the second type, further perform:
delivering the query statement to a second database in response to the operation type corresponding to the query statement being the second type; and
completing the data processing request in the second database based on the query statement.

28. The computing device of clause 27, wherein the first database is a distributed read-write database for processing query statements of the first type, and the second database is a distributed read-only database for processing query statements of the second type.

29. The computing device of clause 28, wherein the first type is an on-line transaction processing (OLTP) type and the one or more processors are configured to execute the computer-executable instructions to cause the computing device to correspondingly deliver the query statement to the first database in response to the operation type being the first type by:
delivering the query statement to the distributed read-write database in response to the operation type being the OLTP type.

30. The computing device of clause 29, wherein the second type is an on-line analytical processing (OLAP) type and the one or more processors are configured to execute the computer-executable instructions to cause the computing device to correspondingly deliver the query statement to the second database in response to the operation type corresponding to the query statement being the second type by:

delivering the query statement to the distributed read-only database in response to the operation type corresponding to the query statement being the OLAP type.

31. A non-transitory computer-readable storage medium storing a set of computer instructions that are executable by one or more processors of an apparatus to cause the apparatus to implement a data processing method comprising:

receiving a data processing request carrying a query statement;

converting the query statement into a corresponding relational algebra tree based on the data processing request;

determining an operation type corresponding to the query statement based on the relational algebra tree;

delivering the query statement to a first database in response to the operation type being a first type; and completing the data processing request in the first database based on the query statement.

32. The non-transitory computer-readable storage medium of clause 31, wherein the set of instructions are executable by the one or more processors of the apparatus to cause the apparatus to convert the query statement into the corresponding relational algebra tree by:

parsing the query statement into a corresponding abstract syntax tree, and converting the abstract syntax tree into the corresponding relational algebra tree, wherein the relational algebra tree includes tree nodes and edges.

33. The non-transitory computer-readable storage medium of clause 32, wherein the set of instructions are executable by the one or more processors of the apparatus to cause the apparatus to determine the operation type corresponding to the query statement based on the relational algebra tree by:

determining structural information of the query statement based on the relational algebra tree; and determining that the operation type corresponding to the query statement is the first type in response to the structural information of the query statement satisfying a first preset rule.

34. The non-transitory computer-readable storage medium of clause 33, wherein the set of instructions are executable by the one or more processors of the apparatus to cause the apparatus to, after determining the structural information of the query statement based on the relational algebra tree, further perform:

determining logical information of the query statement based on the relational algebra tree in response to the structural information of the query statement not satisfying the first preset rule; and determining that the operation type corresponding to the query statement is the first type in response to the logical information of the query statement satisfying a second preset rule.

35. The non-transitory computer-readable storage medium of any of clauses 32-34, wherein the set of instructions are executable by the one or more processors of the apparatus to cause the apparatus to determine the operation type corresponding to the query statement based on the relational algebra tree by:

determining logical information of the query statement based on the relational algebra tree; and determining that the operation type corresponding to the query statement is the first type in response to the logical information of the query statement satisfying a second preset rule.

36. The non-transitory computer-readable storage medium of any of clauses 32-35, wherein the set of instructions are executable by the one or more processors of the apparatus to cause the apparatus to determine the operation type corresponding to the query statement based on the relational algebra tree by:

determining structural information and logical information of the query statement based on the relational algebra tree;

in response to the structural information of the query statement not satisfying a first preset rule and the logical information of the query statement not satisfying a second preset rule:

determining an execution plan of the query statement based on the relational algebra tree; and calculating a physical execution cost of the query statement according to the execution plan; and determining that the operation type corresponding to the query statement is the first type in response to the physical execution cost being less than or equal to a preset cost threshold.

37. The non-transitory computer-readable storage medium of any of clauses 32-36, wherein the set of instructions are executable by the one or more processors of the apparatus to cause the apparatus to determine the operation type corresponding to the query statement based on the relational algebra tree by:

determining an execution plan of the query statement based on the relational algebra tree;

calculating a physical execution cost of the query statement according to the execution plan; and determining that the operation type corresponding to the query statement is the first type in response to the physical execution cost being less than or equal to a preset cost threshold.

38. The non-transitory computer-readable storage medium of clause 37, wherein the set of instructions are executable by the one or more processors of the apparatus to cause the apparatus to determine the execution plan of the query statement based on the relational algebra tree and calculate the physical execution cost of the query statement according to the execution plan by:

determining tree nodes of the relational algebra tree to determine the execution plan of the query statement based on the tree nodes;

calculating the physical execution cost of each of the tree nodes corresponding to the query statement based on the execution plan of the query statement; and performing a weighted summation of the physical execution costs of the tree nodes to obtain the physical execution cost of the query statement.

39. The non-transitory computer-readable storage medium of clause 38, wherein the set of instructions are executable by the one or more processors of the apparatus to cause the apparatus to determine that the operation type corresponding to the query statement is the first type in response to the physical execution cost being less than or equal to the preset cost threshold by:

determining that the operation type corresponding to the query statement is the first type in response to the physical execution cost of any of the tree nodes corresponding to the query statement being less than or equal to the preset cost threshold.

40. The non-transitory computer-readable storage medium of any of clauses 37-39, wherein the set of instructions are executable by the one or more processors of the apparatus to cause the apparatus to further perform:

determining that the operation type corresponding to the query statement is a second type in response to the physical execution cost being greater than the preset cost threshold.

41. The non-transitory computer-readable storage medium of clause 40, wherein the set of instructions are executable by the one or more processors of the apparatus to cause the apparatus to, after determining that the operation type corresponding to the query statement is the second type, further perform:

delivering the query statement to a second database in response to the operation type corresponding to the query statement being the second type; and completing the data processing request in the second database based on the query statement.

42. The non-transitory computer-readable storage medium of clause 41, wherein the first database is a distributed read-write database for processing query statements of the first type, and the second database is a distributed read-only database for processing query statements of the second type.

43. The non-transitory computer-readable storage medium of clause 42, wherein the first type is an on-line transaction processing (OLTP) type, and the set of instructions are executable by the one or more processors of the apparatus to cause the apparatus to correspondingly deliver the query statement to the first database in response to the operation type being the first type by:

delivering the query statement to the distributed read-write database in response to the operation type being the OLTP type.

44. The non-transitory computer-readable storage medium of clause 43, wherein the second type is an on-line analytical processing (OLAP) type, and the set of instructions are executable by the one or more processors of the apparatus to cause the apparatus to correspondingly deliver the query statement to the second database in response to the operation type corresponding to the query statement being the second type by:

delivering the query statement to the distributed read-only database in response to the operation type corresponding to the query statement being the OLAP type.

The exemplary embodiments of this disclosure disclosed above are only used to help explain this disclosure. The optional embodiments do not describe all the details, and are not intended to limit the application to the specific implementations described. Obviously, various modifications and changes may be made according to the content of the embodiments of this disclosure. These embodiments are selected and described in this disclosure for better explaining the principles and practical applications of the embodiments of this disclosure, so that a person skilled in the art can better understand and use this disclosure. This disclosure is subject only to the claims and the full scope and equivalents thereof

What is claimed is:

1. A data processing method, comprising:

receiving a data processing request carrying a query statement;

converting the query statement into a corresponding relational algebra tree based on the data processing request by parsing the query statement into a corresponding abstract syntax tree;

and converting the abstract syntax tree into the corresponding relational algebra tree, wherein the relational algebra tree includes tree nodes and edges;

determining an operation type corresponding to the query statement based on the relational algebra tree by:

determining structural information of the query statement and logical information of the query statement based on the relational algebra tree;

in response to the structural information of the query statement not satisfying a first preset rule and the logical information of the query statement not satisfying a second preset rule, determining an execution plan of the query statement based on the relational algebra tree and calculating a physical execution cost of the query statement according to the execution plan; and determining the operation type corresponding to the query statement being a first type in response to the physical execution cost being less than or equal to a preset cost threshold;

delivering the query statement to a first database in response to the operation type being the first type; and completing the data processing request in the first database based on the query statement.

2. The data processing method of claim 1, wherein the determining the operation type corresponding to the query statement based on the relational algebra tree comprises:

determining that the operation type corresponding to the query statement is the first type in response to the structural information of the query statement satisfying the first preset rule.

3. The data processing method of claim 2, wherein after the determining the structural information of the query statement based on the relational algebra tree, the method further comprises:

determining the logical information of the query statement based on the relational algebra tree in response to the structural information of the query statement not satisfying the first preset rule; and determining that the operation type corresponding to the query statement is the first type in response to the logical information of the query statement satisfying the second preset rule.

4. The data processing method of claim 1, wherein the determining the operation type corresponding to the query statement based on the relational algebra tree comprises:

determining that the operation type corresponding to the query statement is the first type in response to the logical information of the query statement satisfying the second preset rule.

5. The data processing method of claim 1, wherein the determining the execution plan of the query statement based on the relational algebra tree and the calculating the physical execution cost of the query statement according to the execution plan comprises:

determining tree nodes of the relational algebra tree to determine the execution plan of the query statement based on the tree nodes;

calculating the physical execution cost of each of the tree nodes corresponding to the query statement based on the execution plan of the query statement; and performing a weighted summation of the physical execution costs of the tree nodes to obtain the physical execution cost of the query statement.

6. The data processing method of claim 5, wherein the determining that the operation type corresponding to the query statement is the first type in response to the physical execution cost being less than or equal to the preset cost threshold comprises:
determining that the operation type corresponding to the query statement is the first type in response to the physical execution cost of any of the tree nodes corresponding to the query statement being less than or equal to the preset cost threshold.

7. The data processing method of claim 1, further comprising:
determining that the operation type corresponding to the query statement is a second type in response to the physical execution cost being greater than the preset cost threshold.

8. The data processing method of claim 7, wherein after the determining that the operation type corresponding to the query statement is the second type, the method further comprises:
delivering the query statement to a second database in response to the operation type corresponding to the query statement being the second type; and
completing the data processing request in the second database based on the query statement.

9. The data processing method of claim 8, wherein the first database is a distributed read-write database for processing query statements of the first type, and the second database is a distributed read-only database for processing query statements of the second type.

10. The data processing method of claim 9, wherein the first type is an on-line transaction processing (OLTP) type; and
correspondingly, the delivering the query statement to the first database in response to the operation type being the first type comprises:
delivering the query statement to the distributed read-write database in response to the operation type being the OLTP type.

11. The data processing method of claim 10, wherein the second type is an on-line analytical processing (OLAP) type; and
correspondingly, the delivering the query statement to the second database in response to the operation type corresponding to the query statement being the second type comprises:
delivering the query statement to the distributed read-only database in response to the operation type corresponding to the query statement being the OLAP type.

12. A computing device, comprising:
a memory storing a set of computer-executable instructions; and
one or more processors configured to execute the computer-executable instructions to cause the computing device to perform:
receiving a data processing request carrying a query statement;
converting the query statement into a corresponding relational algebra tree based on the data processing request by parsing the query statement into a corresponding abstract syntax tree; and converting the abstract syntax tree into the corresponding relational algebra tree, wherein the relational algebra tree includes tree nodes and edges;
determining an operation type corresponding to the query statement based on the relational algebra tree by:
determining structural information of the query statement and logical information of the query statement based on the relational algebra tree;
in response to the structural information of the query statement not satisfying a first preset rule and the logical information of the query statement not satisfying a second preset rule, determining an execution plan of the query statement based on the relational algebra tree and calculating a physical execution cost of the query statement according to the execution plan; and
determining the operation type corresponding to the query statement being a first type in response to the physical execution cost being less than or equal to a preset cost threshold;
delivering the query statement to a first database in response to the operation type being the first type; and
completing the data processing request in the first database based on the query statement.

13. The computing device of claim 12, wherein the one or more processors are configured to execute the computer-executable instructions to cause the computing device to determine the operation type corresponding to the query statement based on the relational algebra tree by:
determining that the operation type corresponding to the query statement is the first type in response to the structural information of the query statement satisfying the first preset rule.

14. The computing device of claim 13, wherein the one or more processors are configured to execute the computer-executable instructions to cause the computing device to, after determining the structural information of the query statement based on the relational algebra tree, further perform:
determining the logical information of the query statement based on the relational algebra tree in response to the structural information of the query statement not satisfying the first preset rule; and
determining that the operation type corresponding to the query statement is the first type in response to the logical information of the query statement satisfying the second preset rule.

15. The computing device of claim 12, wherein the one or more processors are configured to execute the computer-executable instructions to cause the computing device to determine the operation type corresponding to the query statement based on the relational algebra tree by:
determining that the operation type corresponding to the query statement is the first type in response to the logical information of the query statement satisfying a second preset rule.

16. A non-transitory computer-readable storage medium storing a set of computer instructions that are executable by one or more processors of an apparatus to cause the apparatus to implement a data processing method comprising:
receiving a data processing request carrying a query statement;
converting the query statement into a corresponding relational algebra tree based on the data processing request by parsing the query statement into a corresponding abstract syntax tree;
and converting the abstract syntax tree into the corresponding relational algebra tree, wherein the relational algebra tree includes tree nodes and edges;

determining an operation type corresponding to the query statement based on the relational algebra tree by:
    determining structural information of the query statement and logical information of the query statement based on the relational algebra tree;
    in response to the structural information of the query statement not satisfying a first preset rule and the logical information of the query statement not satisfying a second preset rule, determining an execution plan of the query statement based on the relational algebra tree and calculating a physical execution cost of the query statement according to the execution plan; and
    determining the operation type corresponding to the query statement being a first type in response to the physical execution cost being less than or equal to a preset cost threshold;

delivering the query statement to a first database in response to the operation type being a first type; and completing the data processing request in the first database based on the query statement.

* * * * *